United States Patent
Hu et al.

(10) Patent No.: US 11,893,789 B2
(45) Date of Patent: Feb. 6, 2024

(54) DEEP NEURAL NETWORK POSE ESTIMATION SYSTEM

(71) Applicant: Magic Leap, Inc., Plantation, FL (US)

(72) Inventors: Danying Hu, San Jose, CA (US); Daniel DeTone, San Francisco, CA (US); Tomasz Jan Malisiewicz, Mountain View, CA (US)

(73) Assignee: Magic Leap, Inc., Plantation, FL (US)

( * ) Notice: Subject to any disclaimer, the term of this patent is extended or adjusted under 35 U.S.C. 154(b) by 380 days.

(21) Appl. No.: 17/288,877

(22) PCT Filed: Nov. 14, 2019

(86) PCT No.: PCT/US2019/061502
§ 371 (c)(1),
(2) Date: Apr. 26, 2021

(87) PCT Pub. No.: WO2020/102554
PCT Pub. Date: May 22, 2020

(65) Prior Publication Data
US 2021/0350566 A1 Nov. 11, 2021

Related U.S. Application Data

(60) Provisional application No. 62/767,902, filed on Nov. 15, 2018.

(51) Int. Cl.
*G06V 20/20* (2022.01)
*G06T 7/80* (2017.01)
(Continued)

(52) U.S. Cl.
CPC ......... *G06V 20/20* (2022.01); *G02B 27/0172* (2013.01); *G06N 3/045* (2023.01);
(Continued)

(58) Field of Classification Search
CPC ........ G06V 20/20; G06V 10/17; G06V 40/10; G06V 10/82; G06V 10/225; G06T 7/80;
(Continued)

(56) References Cited

U.S. PATENT DOCUMENTS 6,850,221 B1 2/2005 Tickle
10,504,230 B1 * 12/2019 Stahl ................... G06Q 10/087
(Continued)

FOREIGN PATENT DOCUMENTS

JP 2005293141 A 10/2005
WO WO 2020/102554 5/2020

OTHER PUBLICATIONS

Mondéjar-Guerra, Victor, et al. "Robust identification of fiducial markers in challenging conditions." Expert Systems with Applications 93 (2018): 336-345. (Year: 2018).*

(Continued)

*Primary Examiner* — Utpal D Shah
(74) *Attorney, Agent, or Firm* — Fish & Richardson P.C.

(57) ABSTRACT

A deep neural network provides real-time pose estimation by combining two custom deep neural networks, a location classifier and an ID classifier, with a pose estimation algorithm to achieve a 6DOF location of a fiducial marker. The locations may be further refined into subpixel coordinates using another deep neural network. The networks may be trained using a combination of auto-labeled videos of the target marker, synthetic subpixel corner data, and/or extreme data augmentation. The deep neural network provides improved pose estimations particularly in challenging low-light, high-motion, and/or high-blur scenarios.

20 Claims, 9 Drawing Sheets

(51) Int. Cl.
| | |
|---|---|
| *G06T 7/70* | (2017.01) |
| *G06N 3/08* | (2023.01) |
| *G06T 3/40* | (2006.01) |
| *G06T 9/00* | (2006.01) |
| *G06N 3/045* | (2023.01) |
| *G02B 27/01* | (2006.01) |
| *G06T 19/00* | (2011.01) |
| *G06V 10/10* | (2022.01) |
| *G06V 10/82* | (2022.01) |
| *G06V 10/22* | (2022.01) |
| *G06V 40/10* | (2022.01) |

(52) U.S. Cl.
CPC ............. *G06N 3/08* (2013.01); *G06T 3/4046* (2013.01); *G06T 7/70* (2017.01); *G06T 7/80* (2017.01); *G06T 9/002* (2013.01); *G06T 19/006* (2013.01); *G06V 10/17* (2022.01); *G06V 10/225* (2022.01); *G06V 10/82* (2022.01); *G06V 40/10* (2022.01); *G06T 2207/30244* (2013.01)

(58) Field of Classification Search
CPC ......... G06T 7/70; G06T 3/4046; G06T 9/002; G06T 19/006; G06T 2207/30244; G06N 3/045; G06N 3/08; G02B 27/0172
See application file for complete search history.

(56) References Cited

U.S. PATENT DOCUMENTS

| | | | |
|---|---|---|---|
| 10,593,101 | B1* | 3/2020 | Han ........................ G06T 7/55 |
| 10,621,747 | B2 | 4/2020 | Malisiewicz et al. |
| 10,719,953 | B1* | 7/2020 | Ye ........................... G06T 7/246 |
| 11,136,022 | B2* | 10/2021 | Matta ..................... G06V 20/56 |
| 11,345,040 | B2* | 5/2022 | Oleynik ............. G05B 19/4183 |
| 11,707,955 | B2* | 7/2023 | Smith ..................... B60D 1/64 701/28 |
| 2006/0028436 | A1 | 2/2006 | Armstrong |
| 2007/0081123 | A1 | 4/2007 | Lewis |
| 2012/0127062 | A1 | 5/2012 | Bar-Zeev et al. |
| 2012/0162549 | A1 | 6/2012 | Gao et al. |
| 2013/0082922 | A1 | 4/2013 | Miller |
| 2013/0117377 | A1 | 5/2013 | Miller |
| 2013/0125027 | A1 | 5/2013 | Abovitz |
| 2013/0208234 | A1 | 8/2013 | Lewis |
| 2013/0242262 | A1 | 9/2013 | Lewis |
| 2014/0071539 | A1 | 3/2014 | Gao |
| 2014/0177023 | A1 | 6/2014 | Gao et al. |
| 2014/0218468 | A1 | 8/2014 | Gao et al. |
| 2014/0267420 | A1 | 9/2014 | Schowengerdt |
| 2015/0016777 | A1 | 1/2015 | Abovitz et al. |
| 2015/0103306 | A1 | 4/2015 | Kaji et al. |
| 2015/0178939 | A1 | 6/2015 | Bradski et al. |
| 2015/0205126 | A1 | 7/2015 | Schowengerdt |
| 2015/0248789 | A1 | 9/2015 | Abovitz et al. |
| 2015/0309263 | A2 | 10/2015 | Abovitz et al. |
| 2015/0326570 | A1 | 11/2015 | Publicover et al. |
| 2015/0346495 | A1 | 12/2015 | Welch et al. |
| 2016/0011419 | A1 | 1/2016 | Gao |
| 2016/0026253 | A1 | 1/2016 | Bradski et al. |
| 2017/0372174 | A1 | 12/2017 | Wshah et al. |
| 2017/0374360 | A1 | 12/2017 | Kranski et al. |
| 2019/0057515 | A1* | 2/2019 | Teixeira .................... G06T 7/50 |
| 2019/0201106 | A1* | 7/2019 | Siemionow ............ A61B 5/055 |
| 2019/0261957 | A1* | 8/2019 | Zaslavsky .............. A61B 8/565 |
| 2021/0038921 | A1* | 2/2021 | Nguyen ................ A61B 6/488 |
| 2021/0186355 | A1* | 6/2021 | Ben-Yishai ........... A61B 34/10 |

OTHER PUBLICATIONS

DeTone, Daniel, Tomasz Malisiewicz, and Andrew Rabinovich. "Superpoint: Self-supervised interest point detection and description." Proceedings of the IEEE conference on computer vision and pattern recognition workshops. 2018. (Year: 2018).*

International Search Report and Written Opinionfor PCT Application No. PCT/US19/61502, dated Mar. 18, 2020.

International Preliminary Report on Patentability for PCT Application No. PCT/US19/61502, dated May 18, 2021.

ARToolKit: https://web.archive.org/web/20051013062315/http://www.hitl.washington.edu:80/artoolkit/documentation/hardware.htm, archived Oct. 13, 2005.

Azuma, "A Survey of Augmented Reality," Teleoperators and Virtual Environments 6, (Aug. 4, 1997), pp. 355-385. https://web.archive.org/web/20010604100006/http://www.cs.unc.edu/~azuma/ARpresence.pdf.

Azuma, "Predictive Tracking for Augmented Realty," TR95-007, Department of Computer Science, UNC-Chapel Hill, NC, Feb. 1995.

Bimber, et al., "Spatial Augmented Reality—Merging Real and Virtual Worlds," 2005 https://web.media.mit.edu/~raskar/book/BimberRaskarAugmentedRealityBook.pdf.

Hu, et al., "Deep ChArUco: Dark ChArUco Marker Pose Estimation," Magic Leap, Inc., arXiv:1812.03247v2 [cs.CV] Jul. 2, 2019.

Jacob, "Eye Tracking in Advanced Interface Design," Human-Computer Interaction Lab Naval Research Laboratory, Washington, D.C. / paper/ in Virtual Environments and Advanced Interface Design, ed. by W. Barfield and T.A. Furness, pp. 258-288, Oxford University Press, New York (1995).

Tanriverdi and Jacob, "Interacting With Eye Movements in Virtual Environments," Department of Electrical Engineering and Computer Science, Tufts University, Medford, MA—paper/Proc. ACM CHI 2000 Human Factors in Computing Systems Conference, pp. 265-272, Addison-Wesley/ACM Press (2000).

Dash et al., "Designing of marker-based augmented reality learning environment for kids using convolutional neural network architecture," Displays Devices, 2018, 55:46-54.

Extended European Search Report in European Appln. No. 19883465.7, dated Jul. 12, 2022, 12 pages.

Hu et al., "Paper: Accurate fiducial mapping for pose estimation using manifold optimization," Paper, Presented at Proceedings of the 2018 International Conference on Indoor Positioning and Indoor Navigation (IPIN), Nantes, France, Sep. 24-27, 2018, 8 pages.

Strisciuglio et al., "Paper: Camera localization in outdoor garden environments using artificial landmarks," Paper, Presented at Proceedings of the 2018 IEEE International Work Conference on Bioinspired Intelligence (IWOBI), San Carlos, Costa Rica, Jul. 18-20, 2018, 7 pages.

Office Action in Japanese Appln. No. 2021-525097, dated Jul. 13, 2023, 5 pages (with English translation).

* cited by examiner

DEEP NEURAL NETWORK POSE ESTIMATION SYSTEM

RELATED APPLICATIONS

This application claims the benefit of priority to U.S. Patent Application No. 62/767,902, filed Nov. 15, 2018, entitled "MARK DETECTION IN VARIABLE LIGHTING," which is hereby incorporated by reference herein in its entirety.

FIELD

The present disclosure relates to virtual reality and augmented reality, including mixed reality, imaging and visualization systems and more particularly to systems and methods for displaying and interacting with virtual content.

BACKGROUND

Modern computing and display technologies have facilitated the development of systems for so called "virtual reality," "augmented reality," and "mixed reality" experiences, wherein digitally reproduced images are presented to a user in a manner such that they seem to be, or may be perceived as, real. A virtual reality (VR) scenario typically involves presentation of computer-generated virtual image information without transparency to other actual real-world visual input. An augmented reality (AR) scenario typically involves presentation of virtual image information as an augmentation to visualization of the actual world around the user. Mixed reality (MR) is a type of augmented reality in which physical and virtual objects may co-exist and interact in real time. Systems and methods disclosed herein address various challenges related to VR, AR and MR technology.

SUMMARY

Details of one or more implementations of the subject matter described in this specification are set forth in the accompanying drawings and the description below. Other features, aspects, and advantages will become apparent from the description, the drawings, and the claims. Neither this summary nor the following detailed description purports to define or limit the scope of the inventive subject matter.

BRIEF DESCRIPTION OF THE DRAWINGS

Throughout the drawings, reference numbers are re-used to indicate correspondence between referenced elements. The following drawings and the associated descriptions are provided to illustrate embodiments of the present disclosure and do not limit the scope of the claims.

The drawings illustrate the design and utility of various embodiments of the present disclosure. It should be noted that the figures are not drawn to scale and that elements of similar structures or functions are represented by like reference numerals throughout the figures. In order to better appreciate how to obtain the above-recited and other advantages and objects of various embodiments of the disclosure, a more detailed description of the present disclosure briefly described above will be rendered by reference to specific embodiments thereof, which are illustrated in the accompanying drawings. Understanding that these drawings depict only typical embodiments of the disclosure and are not therefore to be considered limiting of its scope, the disclosure will be described and explained with additional specificity and detail through the use of the accompanying drawings in which.

DETAILED DESCRIPTION

Introduction

Figure 1:
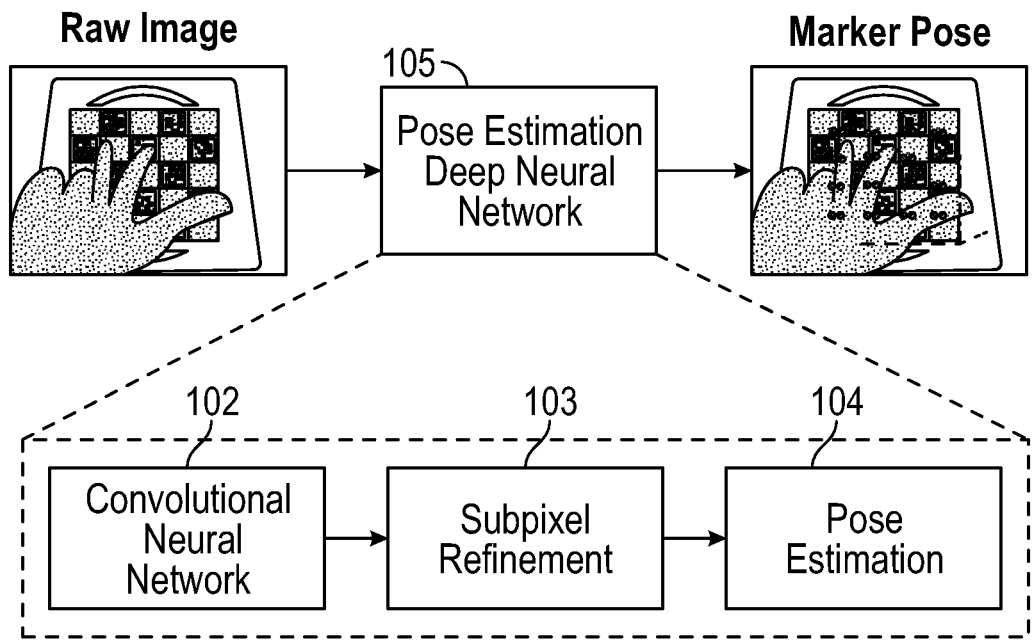
FIG. 1 is a block diagram illustrating an overview of a pose estimation deep neural network (also referred to herein as "Deep ChArUco" or a "DNN").

Optical fiducials such as ChArUco boards are used for camera calibration, pose estimation and verification in computer vision and augmented reality. Described herein is a real-time pose estimation system that includes a two-headed deep neural network combined with a perspective-n-point (PnP) algorithm that provides pose estimates of optical fiducials in images. The first neural network includes a convolutional encoder and a two-headed marker-specific convolutional neural network (CNN) that outputs ID-specific classifiers and 2D point locations. A subpixel refinement then refines the 2D point locations into subpixel coordinates. Finally, a pose estimation system algorithm determines the marker pose in the input images. Advantageously, the deep neural network works well in low-light, high-motion, and/or high-blur scenarios.

Terms

In order to facilitate an understanding of the systems and methods discussed herein, a number of terms are described below. The terms described below, as well as other terms used herein, should be construed to include the provided descriptions, the ordinary and customary meaning of the terms, and/or any other implied meaning for the respective terms, wherein such construction is consistent with context of the term. Thus, the descriptions below do not limit the meaning of these terms, but only provide example descriptions.

Fiducial (or Marker): a computer-vision-friendly 2D pattern that is unique and has enough points for 6DoF pose estimation. Examples of markers include ArUco markers and ChArUco markers.

OpenCV (Open Source Computer Vision Library): an open source computer vision and machine learning software library (see, e.g., https://opencv.org/about).

ArUco markers: square fiducial markers that can be detected by a computer vision system and are usable for camera pose estimation. For example, an ArUco marker may be a square with a black border and an inner binary matrix that encodes an identifier (id) of the marker.

Marker Detection: May include a marker candidate detection stage followed by decoding the content of each marker candidate to determine if it is really a marker.

Pose Estimation: After detecting one or more markers in an image, the camera pose may be estimated. In some implementations, calibration parameters of the camera (e.g., camera matrix and distortion coefficients) may be used in the pose estimation.

Fiducial (or marker) board: a set of markers that acts like a single marker in the sense that it provides a single pose for the camera. The camera pose with reference to a marker is the 3D transformation from the marker coordinate system to the camera coordinate system. The pose may be specified with a rotation and a translation vector. Through use of a marker board, pose estimation is more versatile because only some markers are necessary to perform pose estimation. Thus, the pose can be calculated even in the presence of occlusions or partial views. Accordingly, the obtained pose is usually more accurate since a higher amount of point correspondences (marker corners) are employed.

ChArUco board: A substrate (e.g., paper) that includes multiple fiducials with encoded identifiers. A ChArUco board combines the versatility of ArUco boards with the high corner refinement accuracy achieved with chessboard patterns, providing a less restrictive camera calibration procedure. ArUco markers and boards have limited accuracy of their corner positions, even after applying subpixel refinement. However, corners of chessboard patterns can be refined more accurately since each corner is surrounded by two black squares, but identifying a chessboard pattern is not as versatile as finding an ArUco board because it has to be completely visible and occlusions are not permitted. A ChArUco board combines the benefits of the ArUco and chessboard patterns.

Pose Estimation: An algorithm that determines an object pose from a set of 3D points and their corresponding 2D projections in an image. For example, a pose estimation algorithm, such as a Perspective-n-Point algorithm, may determine the rotation and the translation vectors that transform a 3D point expressed in the object coordinate frame to the camera coordinate frame.

Example Neural Networks

A layer of a neural network (NN), such as a deep neural network (DNN) can apply a linear or non-linear transformation to its input to generate its output. A deep neural network layer can be a normalization layer, a convolutional layer, a softsign layer, a rectified linear layer, a concatenation layer, a pooling layer, a recurrent layer, an inception-like layer, or any combination thereof. The normalization layer can normalize the brightness of its input to generate its output with, for example, L2 normalization. The normalization layer can, for example, normalize the brightness of a plurality of images with respect to one another at once to generate a plurality of normalized images as its output. Non-limiting examples of methods for normalizing brightness include local contrast normalization (LCN) or local response normalization (LRN). Local contrast normalization can normalize the contrast of an image non-linearly by normalizing local regions of the image on a per pixel basis to have a mean of zero and a variance of one (or other values of mean and variance). Local response normalization can normalize an image over local input regions to have a mean of zero and a variance of one (or other values of mean and variance). The normalization layer may speed up the training process.

The convolutional layer can apply a set of kernels that convolve its input to generate its output. The softsign layer can apply a softsign function to its input. The softsign function (softsign(x)) can be, for example, $(x/(1+|x|))$. The softsign layer may neglect impact of per-element outliers. The rectified linear layer can be a rectified linear layer unit (ReLU) or a parameterized rectified linear layer unit (PReLU). The ReLU layer can apply a ReLU function to its input to generate its output. The ReLU function ReLU(x) can be, for example, max(0, x). The PReLU layer can apply a PReLU function to its input to generate its output. The PReLU function PReLU(x) can be, for example, x if $x \geq 0$ and ax if $x<0$, where a is a positive number. The concatenation layer can concatenate its input to generate its output. For example, the concatenation layer can concatenate four 5×5 images to generate one 20×20 image. The pooling layer can apply a pooling function which down samples its input to generate its output. For example, the pooling layer can down sample a 20×20 image into a 10×10 image. Non-limiting examples of the pooling function include maximum pooling, average pooling, or minimum pooling.

At a time point t, the recurrent layer can compute a hidden state s(t), and a recurrent connection can provide the hidden state s(t) at time t to the recurrent layer as an input at a subsequent time point t+1. The recurrent layer can compute its output at time t+1 based on the hidden state s(t) at time t. For example, the recurrent layer can apply the softsign function to the hidden state s(t) at time t to compute its output at time t+1. The hidden state of the recurrent layer at time t+1 has as its input the hidden state s(t) of the recurrent layer at time t. The recurrent layer can compute the hidden state s(t+1) by applying, for example, a ReLU function to its input. The inception-like layer can include one or more of the normalization layer, the convolutional layer, the softsign layer, the rectified linear layer such as the ReLU layer and the PReLU layer, the concatenation layer, the pooling layer, or any combination thereof.

The number of layers in the NN can be different in different implementations. For example, the number of layers in the lower layers or the middle layers can be 50, 100, 200, or more. The input type of a deep neural network layer can be different in different implementations. For example, a layer can receive the outputs of a number of layers as its input. The input of a layer can include the outputs of five layers. As another example, the input of a layer can include 1% of the layers of the NN. The output of a layer can be the inputs of a number of layers. For example, the output of a layer can be used as the inputs of five layers. As another example, the output of a layer can be used as the inputs of 1% of the layers of the NN.

The input size or the output size of a layer can be quite large. The input size or the output size of a layer can be n×m, where n denotes the width and m denotes the height of the input or the output. For example, n or m can be 11, 21, 31, or more. The channel sizes of the input or the output of a layer can be different in different implementations. For example, the channel size of the input or the output of a layer can be 4, 16, 32, 64, 128, or more. The kernel size of a layer can be different in different implementations. For example, the kernel size can be n×m, where n denotes the width and m denotes the height of the kernel. For example, n or m can be 5, 7, 9, or more. The stride size of a layer can be different in different implementations. For example, the stride size of a deep neural network layer can be 3, 5, 7 or more.

In some embodiments, a NN can refer to a plurality of NNs that together compute an output of the NN. Different NNs of the plurality of NNs can be trained for different tasks. A processor (e.g., a processor of the local data processing module 1124 descried with reference to FIG. 11) can compute outputs of NNs of the plurality of NNs to determine an output of the NN. For example, an output of a NN of the plurality of NNs can include a likelihood score. The processor can determine the output of the NN including the plurality of NNs based on the likelihood scores of the outputs of different NNs of the plurality of NNs.

Overview of Example Embodiments

Models representing data relationships and patterns, such as functions, algorithms, systems, and the like, may accept one or more inputs, and produce one or more outputs that corresponds to the one or more inputs in some way. For example, a model may be implemented as a machine learning method such as a convolutional neural network (CNN) or a deep neural network (DNN). Deep learning is part of a broader family of machine learning methods based on the idea of learning data representations as opposed to task specific algorithms and shows a great deal of promise in solving audiovisual computational problems useful for augmented reality, mixed reality, virtual reality, and machines intelligence. In machine learning, a convolutional neural network (CNN, or ConvNet) can include a class of deep, feed-forward artificial neural networks, and CNNs have successfully been applied to analyzing visual imagery. Machine learning methods include a family of methods that can enable robust and accurate solutions to a wide variety of problems, including eye image segmentation and eye tracking.

A sparse point representation may be the output of a simultaneous localization and mapping (e.g., SLAM or vSLAM, referring to a configuration wherein the input is images/visual only), which may be used to reconstruct the world by first placing a small number of fixed and unique patterns in the world. The pose of a calibrated camera can be estimated once at least one marker is detected. However, standard ChArUco marker detection systems may be frail. Thus, described herein are systems and methods for a state-of-the-art Deep ChArUco marker detector based on deep neural networks.

Figure 11:
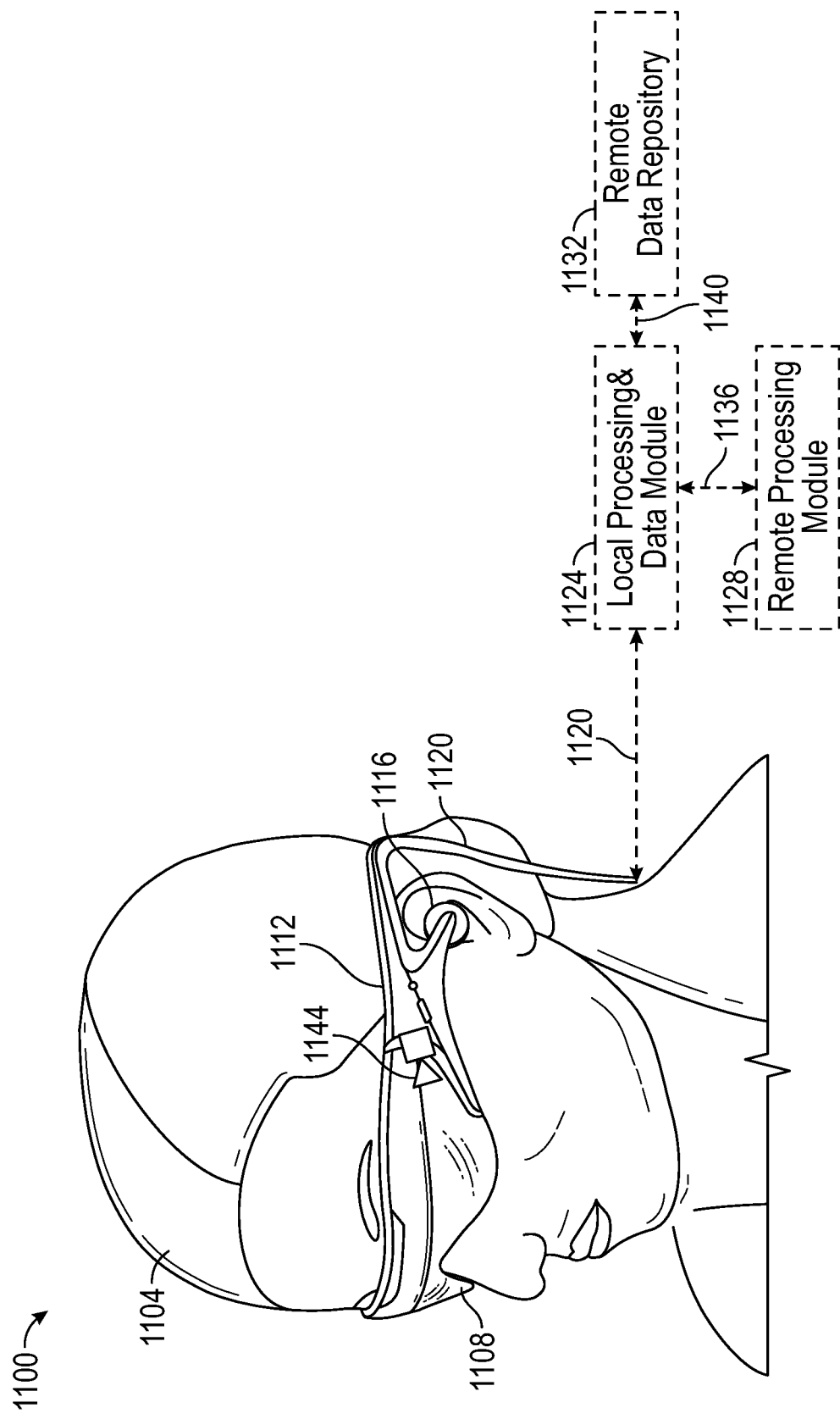
FIG. 11 illustrates an example of a wearable display system that can be used to present a VR, AR, or MR experience to a display system wearer or viewer.

FIG. 1 is a block diagram illustrating an overview of a pose estimation deep neural network (also referred to herein as "Deep ChArUco" or a "DNN") configured to analyze a raw image and through multiple stages of analysis, calculate an estimate pose of the camera (e.g., a camera that is part of a wearable headset in a mixed reality system, such as is illustrated in FIG. 11).

In the embodiment of FIG. 1, a DNN 105 is an end-to-end system for ChArUco marker pose estimation from a single image (and/or a series of images). In this example implementation, the DNN 105 includes a two-headed convolutional neural network (or "2HCNN") 102 (e.g., for point detection), a subpixel refinement component 103 (e.g., for subpixel refinement), and a pose estimation component 104 (e.g., for pose estimation). For example, the 2HCNN 102 may include a neural network configured to identify ChArUco markers and output 2D location classifiers and marker IDs, the subpixel refinement component 103 may include a RefineNet algorithm, and the pose estimation component 104 may include a PnP algorithm. In some embodiments, other neural networks and algorithms may be used in place of, or in addition to, the neural networks and algorithms discussed herein.

Discussed herein are several scenarios under which traditional computer vision techniques may fail to detect ChArUco markers, and new techniques that may utilize the DNN 105 (or "Deep ChArUco") as a deep convolutional neural network system that may be trained to be accurate and robust for ChArUco marker detection and pose estimation.

Some of the innovations and advantages that may be realized by certain embodiments discussed herein include:
  A real-time marker detector that improves the robustness and accuracy of ChArUco pattern detection under extreme lighting and motion conditions, for example.
  Two neural network architectures for point ID classification (e.g., 2HCNN 102) and subpixel refinement (e.g., Subpixel refinement 103), for example.
  A training dataset collection recipe involving auto-labeling images and synthetic data generation, for example.

Figure 2:
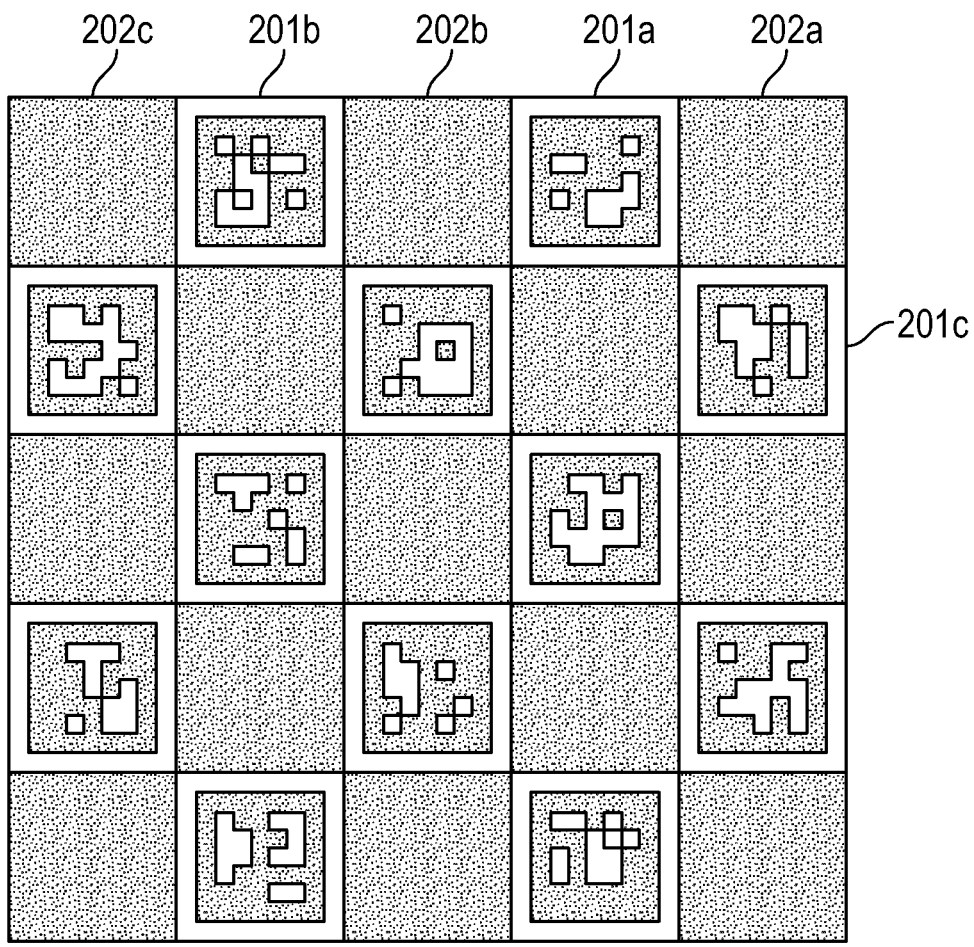
FIG. 2 illustrates an example ChArUco board that includes a plurality of ArUco markers between checkerboard squares.

As noted above, a ChArUco board is a chessboard with ArUco markers embedded inside the white squares. FIG. 2 illustrates an example ChArUco board that includes ArUco markers 201 (including markers 201*a*-201*n*) between checkerboard squares 202 (including squares 202*a*-202*n*). In some embodiments, the markers 201 may be other types of markers, such as ARTag or AprilTag.

A ChArUco detector will first detect the individual ArUco markers. The detected ArUco markers are used to interpolate and refine the position of the chessboard corners based on the predefined board layout. Because a ChArUco board will generally have 10 or more points (the example of FIG. 2 includes 12 markers 201), ChArUco detectors allow occlusions or partial views when used for pose estimation. Using a OpenCV method, detection of a given ChArUco board is equivalent to detecting each chessboard inner corner associated with a unique identifier.

In the examples discussed herein, a 5×5 ChArUco board which contains the first 12 elements of the DICT_5×5_50 ArUco dictionary. In some embodiments, each 4×4 chessboard inner corner may be assigned a unique ID, ranging from 0 to 15, so that one goal of the DNN is to detect these unique 16 corners and IDs (or to detect as many of them as possible).

Figure 3A:
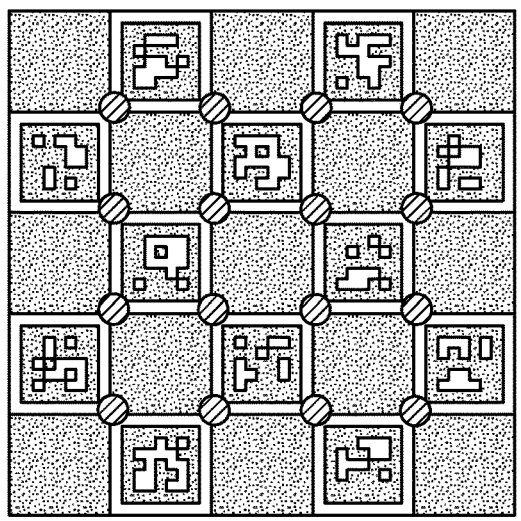
FIGS. 3A-3C illustrate example potential structures in the pattern that could be used to define a single ChArUco board.
Figure 3B:
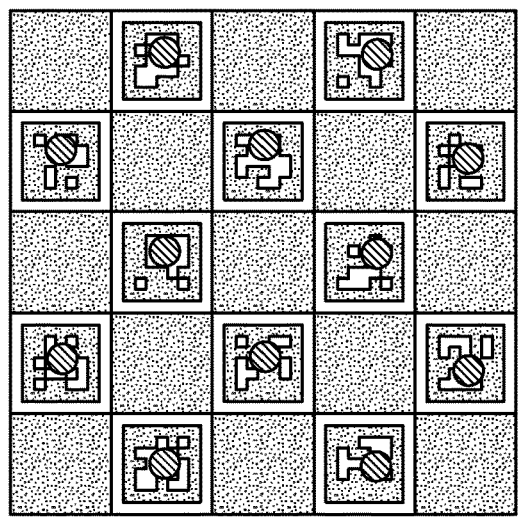
Figure 3C:
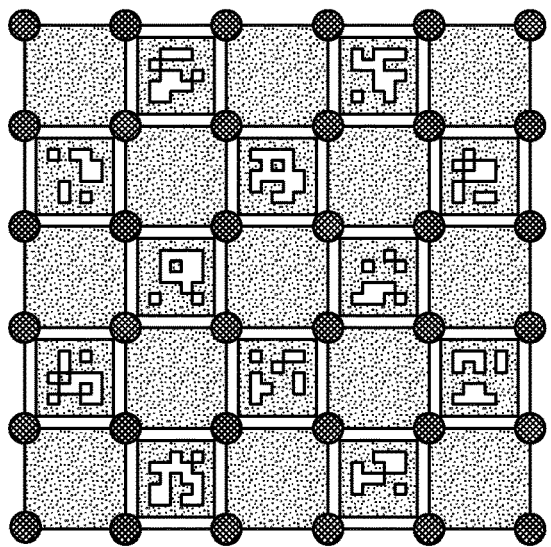

FIGS. 3A-3C illustrate example potential structures in the pattern that could be used to define a single ChArUco board. For example, FIG. 3A illustrates IDs at each corner of the checkerboard (for a total of 6×6=36 IDs), FIG. 3B illustrates interiors of the markers each associated with an ID (for a total of 12 IDs), and FIG. 3C illustrates IDs associated with each corner of the inner 3×3 grid of checkerboard squares and markers (for a total of 4×4=16 IDs). The IDs may be associated with an index, such as from id 0 of the bottom left corner to id 15 of the top right corner in the example of FIG. 3C.

Deep Nets for Object Detection

Examples of deep CNNs include, for example, YOLO, SSD, Faster RCNN, and the like. While these systems may obtain adequate multicategory object detection results, the resulting bounding boxes are typically not suitable for pose inference, especially the kind of high-quality 6DoF pose estimation that is necessary for augmented reality, virtual reality, mixed reality, and the like.

Deep Nets for Keypoint Estimation

Keypoint-based neural networks are usually fully convolutional and return a set of skeleton-like points of the detected objects. Deep Nets for keypoint estimation may be used in human pose estimation, for example. As long as a smaller yet sufficient number of 3D points in the 2D image can be repeatedly detected, pose estimation can be performed (such as by using a PnP algorithm) to recover the camera pose. Albeit indirectly, keypoint-based methods do allow the ability to recover pose using a hybrid deep (for point detection) and classical (for pose estimation) system. One major limitation of most keypoint estimation deep networks is that they are too slow because of the expensive upsampling operations in hourglass networks. Another relevant class of techniques is those designed for human keypoint detection such as faces, body skeletons, and hands.

Example Deep Nets for Feature Point Detection

The last class of deep learning-based techniques relevant to this discussion is deep feature point detection systems—methods that are deep replacements for classical systems like SIFT and ORB. Deep CNNs like a SuperPoint system may be used for joint feature point and descriptor computation. SuperPoint is a single real-time unified CNN which performs the roles of multiple deep modules inside earlier deep learning for interest-point systems like the Learned Invariant Feature Transform (LIFT). Since SuperPoint networks are designed for real-time applications, they are one possible starting point for certain embodiment of a DNN detector.

Example Deep Neural Network ("Deep ChArUco"): A System for ChArUco Detection and Pose Estimation Describe below are implementations of a fully CNN that may be used for ChArUco marker detection. In some embodiments, the DNN (e.g., DNN 105 of FIG. 1) may be an extension of SuperPoint, modified to include a custom head specific to ChArUco marker point identification. Thus, the DNN includes multi-headed SuperPoint variant, for ChArUco marker detection.

In some embodiments, instead of using a descriptor head, as may be done in SuperPoint applications, an ID-head may be used, which directly regresses to corner-specific point IDs. The same point localization head as SuperPoint may be used to output a distribution over pixel location for each 8×8 pixel region in the original image. This allows detection of point locations at full image resolution without using an explicit decoder.

In general, there are multiple strategies for defining point IDs (see FIG. 3). For simplicity, the examples herein use the 4×4 grid of interior chessboard corners for point localization, giving a total of 16 different point IDs to be detected, such as is illustrated in FIG. 3C.

Figure 4:
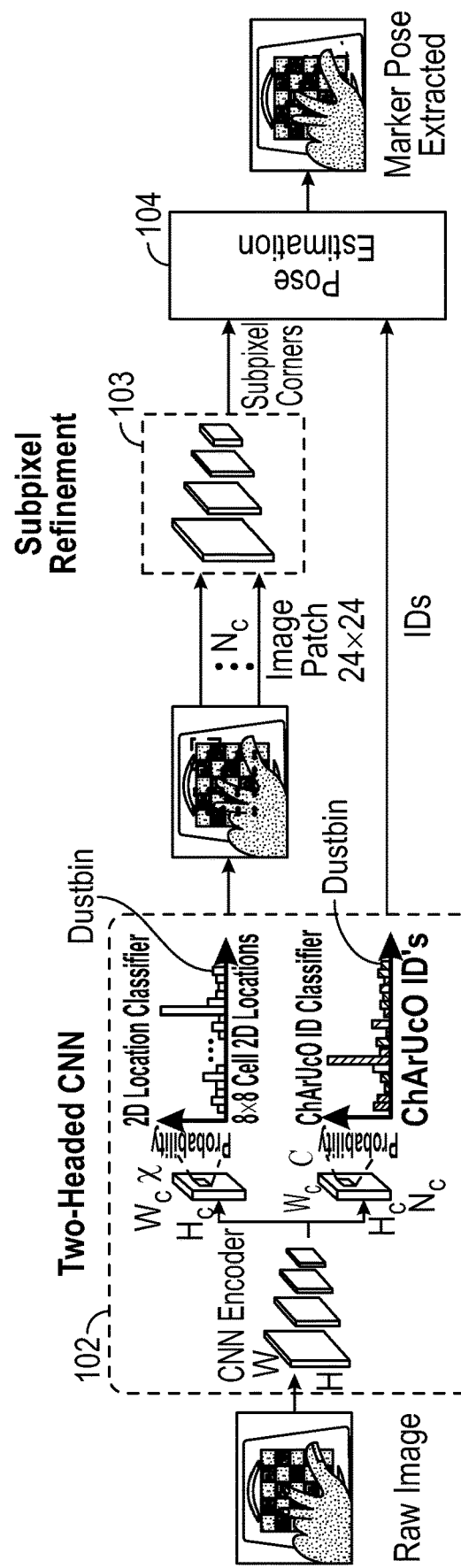
FIG. 4 is a block diagram illustrating further details of an example DNN.

FIG. 4 is a block diagram illustrating further details of an example DNN. In this example, a raw image is first processed by a two-headed CNN 102 and then by the subpixel refinement 103. In some embodiments, the two-headed CNN is a SuperPoint-like network for detecting a specific ChArUco board. However, instead of a descriptor head, a point ID classifier head is used. Thus, one of the network heads detects 2D locations of ChArUco boards in X and the second head classifies them in C. Both heads output per-cell distributions, where each cell is, for example, an 8×8 region of pixels. In this example, 16 unique points IDs may be used for a 5×5 ChArUco board. The output of the 2HCNN 102 is further refined via a subpixel refinement 103 to obtain subpixel locations.

In some embodiments, the ID classification head may output a distribution over 17 possibilities: e.g., a cell can belong to one of the 16 corner IDs or an additional "dustbin" or "none-of-the-above" class. This allows a direct comparison with other methods, for example an OpenCV method, since both the OpenCV and the Deep Neural Network techniques attempt to localize the same 16 ChArUco board-specific points.

Example Two-Headed Neural Network Architecture

In some embodiments, for example the implementation of FIG. 4, the 2HCNN 102 architecture is similar to that of the SuperPoint architecture, with an importation exception—the descriptor head in the SuperPoint network is replaced with a ChArUco ID classification head C.

The 2HCNN 102 may use a VGG-style encoder to reduce the dimensionality of the image. The encoder may include 3×3 convolutional layers, spatial downsampling via pooling, and/or non-linear activation functions. In this example, there are three maxpooling layers which each reduce the spatial dimensionality of the input by a factor of two, resulting in a total spatial reduction by a factor of eight. The shared encoder outputs features with spatial dimension $H_c \times W_c$. We define $H_c = H/8$ and $W_c = W/8$ for an image sized H×W.

In this example implementation, the keypoint detector head outputs a tensor $X \in \mathbb{R}^{H_c \times W_c \times 65}$. Let $N_c$ be the number of ChArUco points to be detected (e.g. for a 4×4 ChArUco grid $N_c$=16). The ChArUco ID classification head outputs a classification tensor $C \in \mathbb{R}^{H_c \times W_c \times (N_c+1)}$ over the $N_c$ classes and a dustbin class, resulting in $N_c+1$ total classes. In some embodiments, the 2HCNN 102 weights take 4:8 Megabytes and the 2HCNN 102 is able to process 320×240 sized images at approximately 100 fps or more using an NVIDIA® GeForce GTX 1080 GPU.

Example Subpixel Refinement Network Architecture

Subpixel localization may be performed to improve pose estimation quality by refining the detected integer corner locations into subpixel corner locations. In some embodiments, this may be performed using RefineNet and/or other deep network trained to produce subpixel coordinates. RefineNet, for example, may take as input a 24×24 image patch and output a single subpixel corner location at eight times the resolution of the central 8×8 region. The subpixel refinement may perform softmax classification over an 8× enlarged central region to find the peak inside the 64×64 subpixel region (e.g., a 4096-way classification problem). In some embodiments, weights take up only 4.1 Megabytes due to a bottleneck layer which converts the 128D activations into 8D before the final 4096D mapping. In some embodiments, both heads of the two-headed 2HCNN 102 may use the same or similar VGG-based backbone as SuperPoint. In this embodiment, for a single imaged ChArUco pattern, there will be at most 16 corners to be detected, so using the subpixel refinement 103 is as expensive as 16 additional forward passes on a network with 24×24 inputs.

Example Pose Estimation

Given a set of 2D point locations and a known physical marker size, a pose estimation algorithm, such as a PnP algorithm, may be used to compute the ChArUco pose with reference to the camera. The PnP algorithm, for example, requires knowledge of K, the camera intrinsics, so that the camera may be calibrated before collecting data. In testing, the camera may be calibrated until the reprojection error falls below 0.15 pixels. OpenCV's solvePnPRansac may then be used to estimate the final pose, as well as in an OpenCV baseline.

Example Training Data Sets

Provided below are example outcomes, comparisons, and training examples that were implemented with the disclosed DNN system. These examples are provided as illustrations of how training may be performed and to exemplify advantageous applications of the disclosed DNN system over conventional systems.

In the examples provided herein, two ChArUco datasets are used to train and evaluate the DNN system. The first dataset focuses on diversity and is used for training the ChArUco detector (see, e.g., FIG. 5). The second dataset contains short video sequences which are designed to evaluate system performance as a function of illumination (see, e.g., FIG. 7).

Example Training Data

Twenty-two short video sequences were collected from a camera with the ChArUco pattern in a random but static pose in each video. Some of the videos include a ChArUco board taped to a monitor with the background changing, and other sequences involve lighting changes (starting with good lighting). In this example, video frames were extracted into the positive dataset with the resolution of 320×240, resulting in a total of 7,955 gray-scale frames. In this example, each video sequence starts with at least 30 frames of good lighting. The ground truth of each video is auto-labeled from the average of the first 30 frames using the classical OpenCV method, as the OpenCV detector works adequately with no motion and good lighting.

In this example, the negative dataset includes 91,406 images in total, including 82,783 generic images from the MS-COCO dataset and 8,623 video frames collected in an office. The in-office data includes images of standard chessboards, which were added to the negatives to improve overall model robustness.

Frames from videos depicting "other" ChArUco markers (e.g., different than the target marker depicted in FIG. 2 were also collected. For these videos, the classifier IDs were treated as negatives but the corner locations were treated as "ignore."

Figure 5:
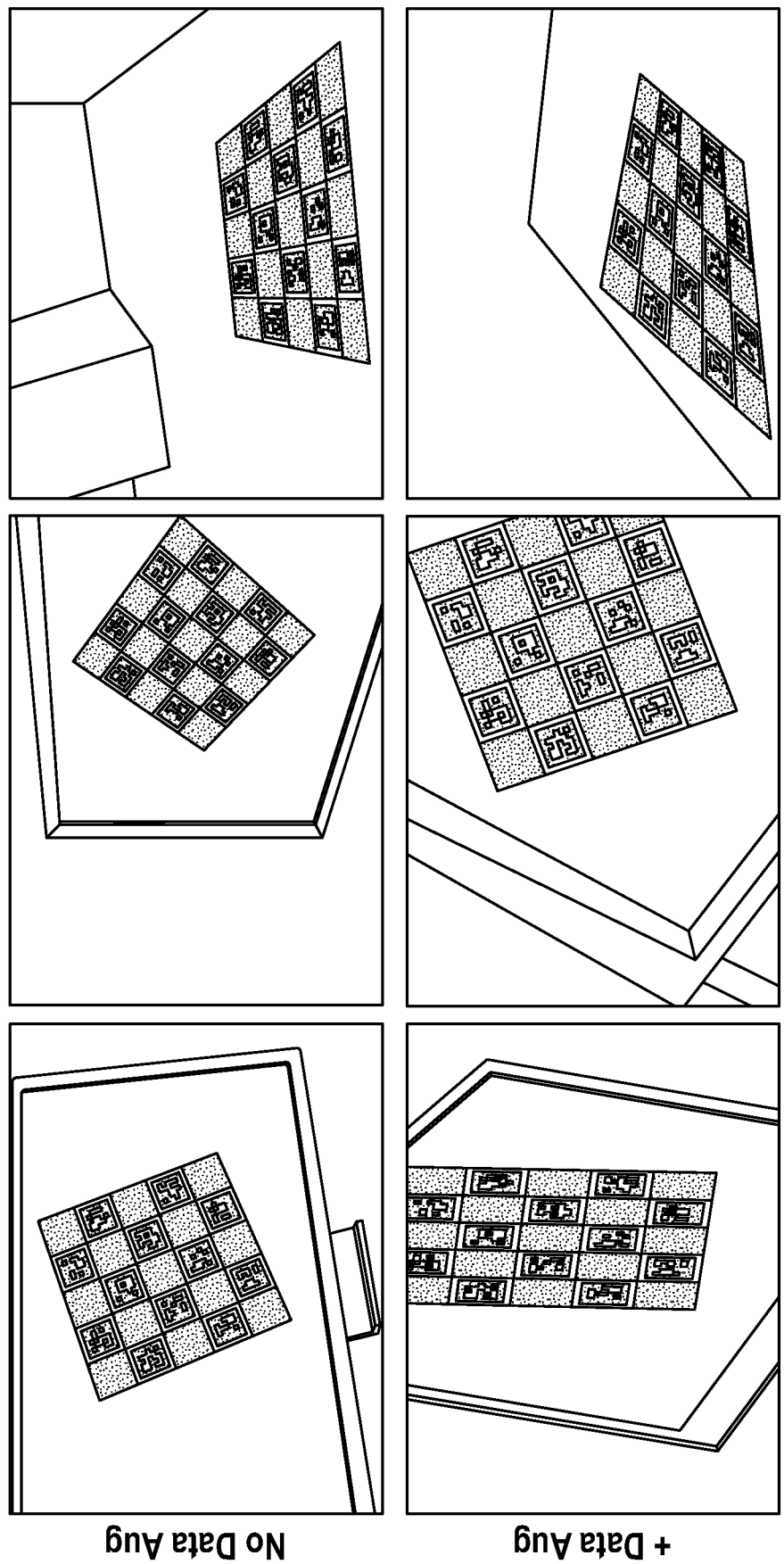
FIG. 5 illustrates images from an example ChArUco Training Set.

FIG. 5 illustrates images from an example ChArUco Training Set. These images are representations of a ChArUco dataset training example, both before and after data augmentation (discussed herein).

Example Data Augmentation

In some embodiments, data augmentation may include a random homographic transform to each frame and/or a set of random combinations of synthetic distortions under certain probability, such as shown in Table 1 (below), during the training stage, which increases diversity of the input dataset. The order and the extent of the applied distortion effects may be randomly selected for each frame. For example, FIG. 5 shows frames from the training sequences (top row) and augmented with a set of distortions (bottom row).

TABLE 1

Synthetic Effects Applied For Data Augmentation. The images were transformed During training to capture more illumination and pose variations.

| Effect | Probability |
| --- | --- |
| additive Gaussian noise | 0.5 |
| motion blur | 0.5 |
| Gaussian blur | 0.25 |
| speckle noise | 0.5 |
| brightness rescale | 0.5 |
| shadow or spotlight effect | 0.5 |
| homographic transform | 1.0 (positive set)/0.0 (negative set) |

Example Training Data for Subpixel Refinement (e.g., RefineNet)

Figure 6:
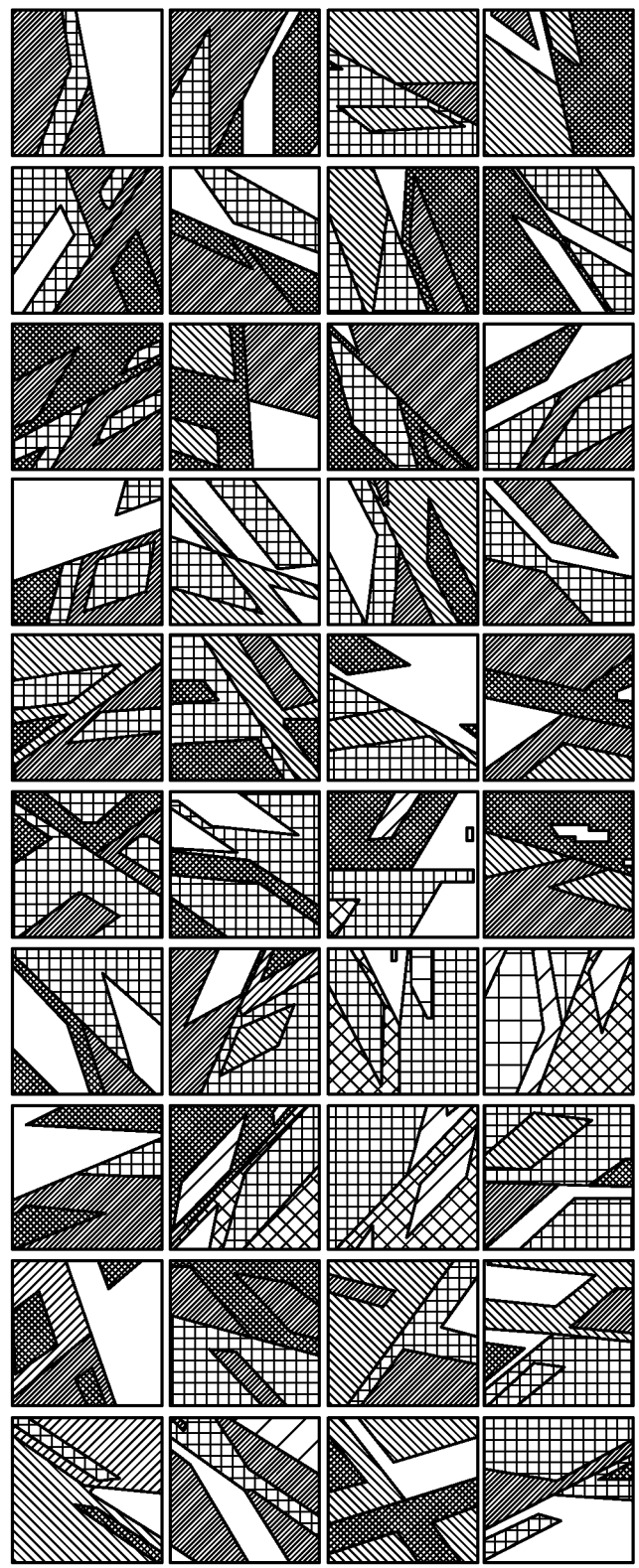
FIG. 6 illustrates forty example training image patches.

In the example testing, RefineNet was trained using a large database of synthetically generated corner images. Each synthetic training image was 24×24 pixels and included exactly one ground-truth corner within the central 8×8 pixel region. FIG. 6 illustrates 40 example training image patches.

Example Evaluation Data

Figure 7:
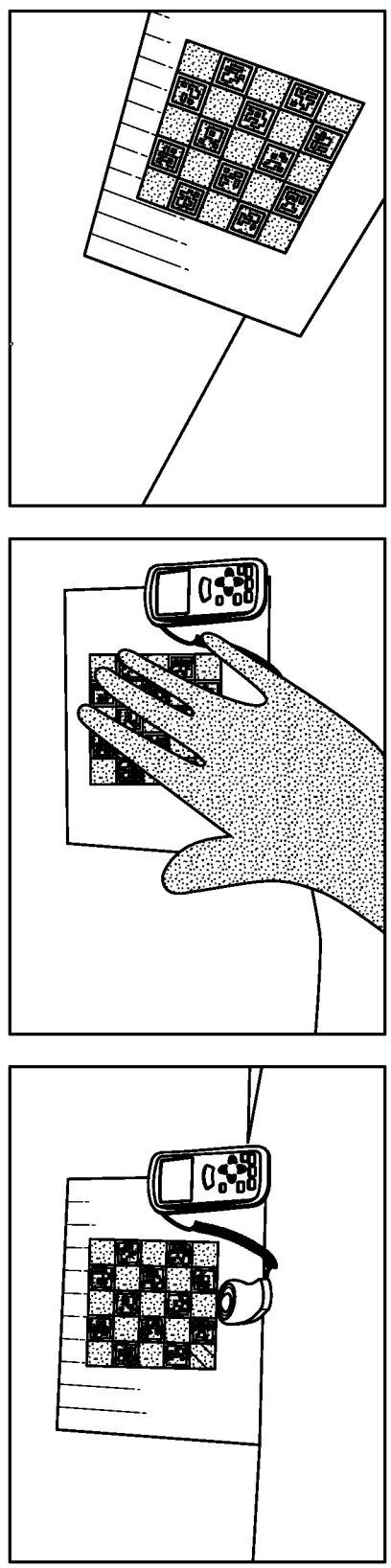
FIG. 7 illustrates three examples frames from the test evaluation data set.

In this example testing, 26 videos of 1000 frames at 30 Hz were captured from a Logitech® webcam. FIG. 7 illustrates three examples frames from the test evaluation data set. FIG. 7 illustrates, from left to right, frames focusing on lighting (10 lux), shadow, and motion blur. In the test implementation, each video in the set focused on one of the following effects:

Lighting brightness (20 videos with 10 different lighting configurations)
Shadow/spotlight (3 videos)
Motion blur (3 videos)

Example Evaluation and Results

The DNN detector is compared against a traditional OpenCV-based ChArUco marker detector in a frame-by-frame manner. Both systems' ability to detect the 16 ChArUco markers for a fixed set of images, under increasing blur and lighting changes (synthetic effects) is first evaluated. Then, on real sequences, the pose of the ChArUco board is estimated based on the PnP algorithm and determine if the pose's reprojection error is below a threshold (typically 3 pixels). The metrics used in the evaluation are outlined herein.

Example Corner Detection Accuracy (Combined Accuracy of the Location and ID Classifiers)

For purposed of this evaluation, a corner is considered correctly detected when the location is within a 3-pixel radius of the ground truth, and the point ID is identified correctly based on the marker ID (e.g., the ChArUco ID). The corner detection accuracy is the ratio between the number of accurately detected corners and the total number of marker corners, 16 in this example. The average accuracy is calculated as the mean of detection accuracy across 20 images with different static poses. To quantitatively measure the pose estimation accuracy in each image frame, the mean reprojection error (re) is used as defined below:

$$re = \frac{\sum_{i=1}^{n} |PC_i - c_i|}{n},$$

where P is the camera projection matrix containing intrinsic parameters, $C_i$ represents the 3D location of a detected corner computed from the ChArUco pose, ci denotes the 2D pixel location of the corresponding corner in the image, n(16) is the total number of the detected ChArUco corners.

In this section, the overall accuracy of the DNN detector and the OpenCV detector under synthetic effects, in which case, the magnitude of the effect linearly is varied, is compared. The first two experiments are aimed to evaluate the accuracy of the two-headed CNN (e.g., ChArUcoNet) output, without relying on the subpixel refinement (e.g., using RefineNet). In each of the 20 synthetic test scenarios, the starting point is an image taken in an ideal environment—good lighting and random static pose (e.g., minimum motion blur), and gradually add synthetic motion blur and darkening.

Figure 8:
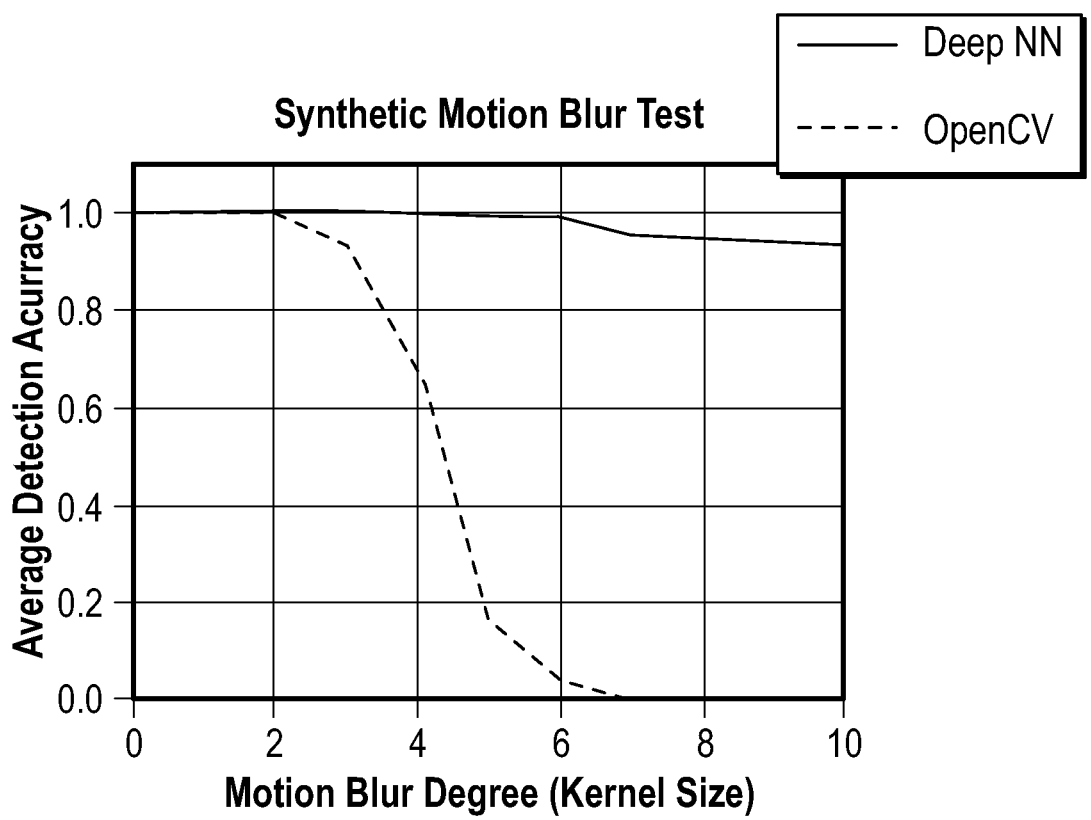
FIG. 8 is a graph illustrating results of a synthetic motion blur test. In particular, average detection accuracy between a DNN and OpenCV on twenty random images from the above-noted test set, while increasing the amount of motion blur.
Figure 9:
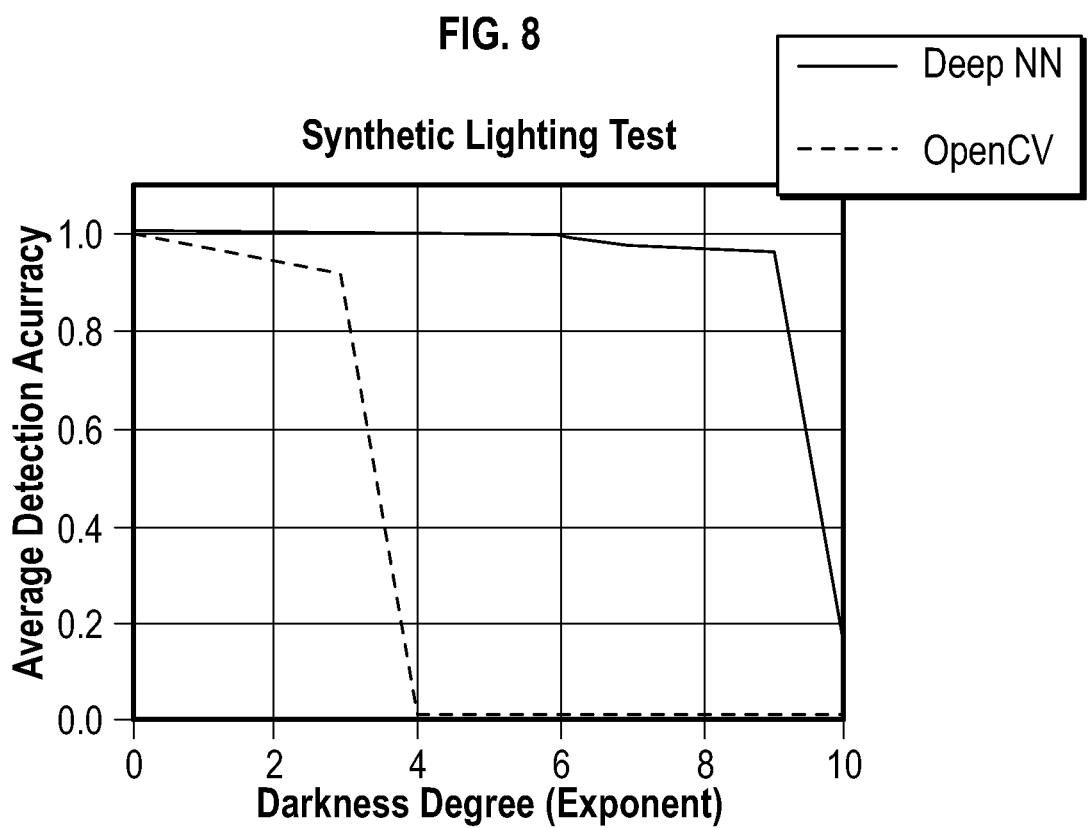
FIG. 9 is a graph illustrating results of a synthetic lighting test, where we compared both detectors under different lighting conditions created synthetically.

FIG. 8 is a graph illustrating results of a synthetic motion blur test. In particular, average detection accuracy between a DNN and OpenCV on 20 random images from the above-noted test set, while increasing the amount of motion blur. In particular, a motion blur filter along the horizontal direction was applied to the original image with the varying kernel sizes (from 0 to 10) to simulate the different degrees of motion blur. As shown in FIG. 9, average detection accuracy versus the degree of motion blur (e.g., the kernel size) is plotted. As shown, the DNN is much more resilient to the motion blur effect compared to the OpenCV approach. In these tests, as illustrated in FIG. 9, the OpenCV method starts to fail above kernel sizes of 2 and completely fails (0% detection accuracy) for kernel sizes of 7 and larger, while DNN only degrades very little (to about 94% detection accuracy), even under extreme blur (kernel size of 10).

FIG. 9 is a graph illustrating results of a synthetic lighting test, where both detectors under different lighting conditions created synthetically are compared. In particular, average detection accuracy was measured for each of a DNN and OpenCV on 20 random images from the above-noted test set, with a brightness rescaling factor $0.6^k$ with k from 0 to 10. In particular, the original image is multiplied with a rescaling factor of $0.6^k$ to simulate increasing darkness. For a set of 11 images with increased brightness rescaling, with the $11^{th}$ image being essentially black, the OpenCV detector accurately detected the first four of eleven images, while the DNN method accurately detected the first ten of the eleven images.

FIG. 9 plots the average detection accuracy versus the darkness degree, k. As shown, the DNN is able to detect markers in many cases where the image is "perceptually black," including more than 50% of the corners even when the brightness is rescaled by a factor of $0.6^9$~0.01, while the OpenCV detector fails at the rescaling factor of $0.6^4$~0.13.

Example Evaluation on Real Sequences

Described below is test data obtained from qualitatively measuring accuracy of both detectors in real video clips captured in different scenarios, such as those evaluation data sets discussed above. In these tests on images having extreme lighting and motion, the DNN significantly outperforms the OpenCV detector. Overall, the DNN detects more correct keypoints where a minimum number of 4 correspondences is necessary for pose estimation.

In one experiment, evaluation was performed across all 26,000 frames in the 26-video dataset, without adding synthetic effects. The fraction of correct poses vs. pose correctness threshold (as measured by reprojection error) is plotted in FIG. 10. Overall, the DNN exhibits a higher detection rate (97.4% vs. 68.8% for OpenCV under a 3-pixel reprojection error threshold) and lower pose error compared to the traditional OpenCV detector. For each sequence in this experiment, Table 2 lists the ChArUco marker detection rate (where $\epsilon_{re}$<3.0) and the mean $\epsilon_{re}$.

As shown in Table 2, above, timing results for various configures of detectors are provided, when running on 320×240 images, with RefineNet, with an OpenCV subpixel refinement step, and without refinement. Additionally, the timing performance of OpenCV detector and refinement are listed.

TABLE 2

| Average processing speed. | |
|---|---|
| Configurations | Approx. fps (Hz) |
| ChArUcoNet + RefineNet | 66.5 |
| ChArUcoNet + cornerSubPix | 98.6 |
| ChArUcoNet + NoRefine | 100.7 |

TABLE 2-continued

| Average processing speed. | |
|---|---|
| Configurations | Approx. fps (Hz) |
| OpenCV detector + cornerSubPix | 99.4 |
| OpenCV detector + NoRefine | 101.5 |

Table 2 illustrates the average processing speed of 320× 240 sized images using each of the indicated configurations. The reported framerate is an average across the evaluation videos described above. Experiments are performed using an NVIDIA® GeForce GTX 1080 GPU. Since the 2HCNN is fully convolutional, it is possible to apply the network to different image resolutions, depending on computational or memory requirements. To achieve the best performance with larger resolution images, a low-resolution image can be passed through the 2HCNN to roughly localize the pattern and then perform subpixel localization via subpixel refinement in the original high-resolution image.

For sequences at 1 and 0.3 lux, the images are too dark for OpenCV to return a pose. For sequences with shadows, DNN detects a good pose 100% of the time, compared to 36% for OpenCV. For videos with motion blur, DNN works 78% of the time, compared to 27% for OpenCV. For a broad range of "bright enough" scenarios ranging from 3 lux to 700 lux, both DNN and OpenCV successfully detect a pose 100% of the time, but DNN has slightly lower reprojection error, $\epsilon_{re}$ on most sequences.

Example DNN Timing Experiments

At this point, it is clear that DNN works well under extreme lighting conditions. Below are example configuration options that may be advantageous for application scenarios with different requirements:

2HCNN+Subpixel Refinement (e.g., RefineNet): This configuration may provide improved accuracy under difficult conditions like motion blur, low light, and strong imaging noise, but with longest post-processing time.

2HCNN+cornerSubPix (e.g., the OpenCV function that fines sub-pixel accurate locations of corners): For comparable accuracy in well-lit environment with less imaging noise, this configuration is recommended with moderate post-processing time.

2HCNN+NoRefine: This configuration is preferred when only the rough pose of the ChArUco pattern is required, especially in a very noisy environment where cornerSubPix will fail. The processing time is therefore the shortest as the image only passes through one 2HCNN.

Figure 10:
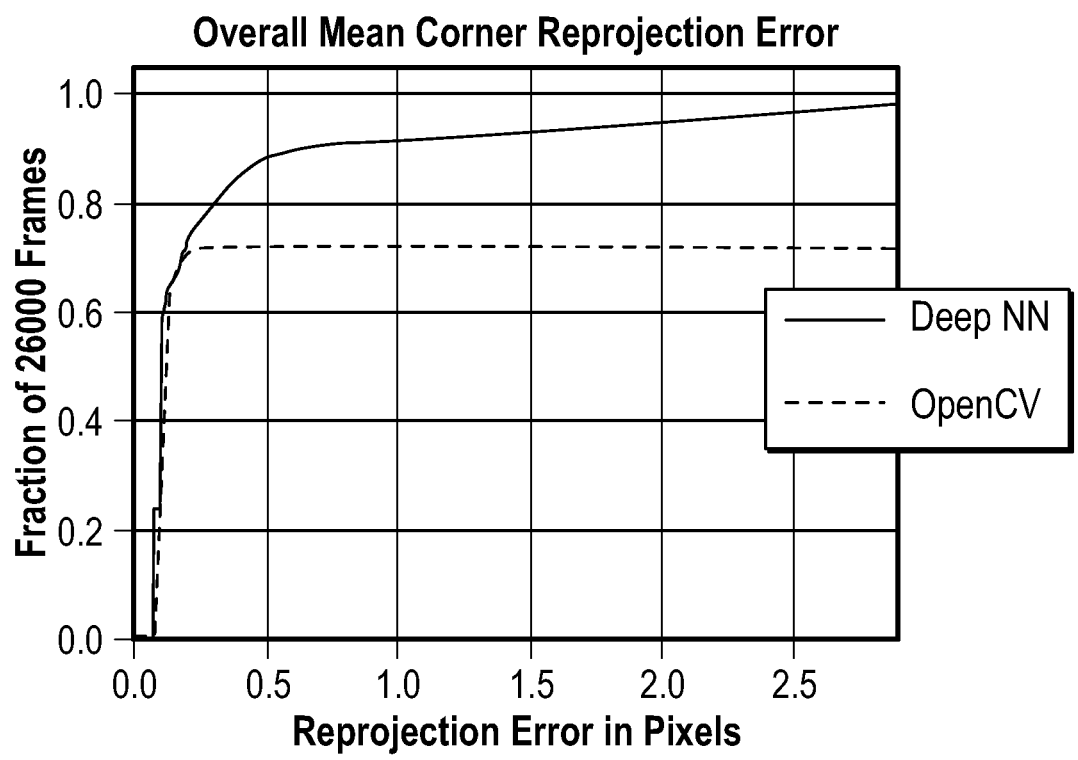
FIG. 10 is a plot illustrating the fraction of correct poses vs. pose correctness threshold (as measured by reprojection error).

FIG. 10 is a chart illustrating DNN vs OpenCV across entire evaluation dataset. FIG. 10 illustrates computed pose accuracy vs. reprojection error Ere threshold across all 26,000 frames in the 26 videos of our evaluation set. DNN exhibits higher pose estimation accuracy (97.4% vs. 68.8% for OpenCV) under a 3 pixel reprojection error threshold.

As discussed above, deep CNNs can dramatically improve the detection rate for ChArUco markers in low-light, high-motion scenarios where the traditional ChArUco marker detection tools, such as those inside OpenCV, often fail. The DNN system, including a combination of the 2HCNN and subpixel refinement, can match or surpass the pose estimation accuracy of the OpenCV detector. The synthetic and real data experiments discussed herein show a performance gap favoring the DNN approach and demonstrate the effectiveness of the neural network architecture. Some of the key ingredients to the DNN may include a 2HCNN for pattern-specific keypoint detection (e.g., ChArUcoNet), a subpixel localization network (e.g., RefineNet), and/or a custom ChArUco pattern-specific dataset, including extreme data augmentation and proper selection of visually similar patterns as negatives. In some embodiments, one or more of these components may not be included. For example, in some embodiments, subpixel localization is not performed. The DNN system may be used in real-time applications requiring marker-based pose estimation, such as in virtual and mixed reality applications.

In the examples herein, particular ChArUco markers were used. By replacing the ChArUco marker with another pattern and collecting a new dataset (with manual labeling if the automatic labeling is too hard to achieve), the same training procedure could be repeated to produce numerous pattern-specific networks. Thus, the systems and methods discussed herein may be applied to various applications of multi-pattern detection, end-to-end learning, and pose estimation of non-planar markers.

Table 3 illustrates the comparison results of DNN and OpenCV on the individual videos. In particular, Table 3 indicates pose detection accuracy (percentage of frames with reprojection error less than 3 pixels) as well as the mean reprojection error,

TABLE 3

Result comparison for individual videos

| Video | deep acc | cv acc | deep $\epsilon_{re}$, | cv $\epsilon_{re}$ |
|---|---|---|---|---|
| 0.3 lux | 100 | 0 | 0.427 (0.858) | nan |
| 0.3 lux | 100 | 0 | 0.388 (9.843) | nan |
| 1 lux | 100 | 0 | 0.191 (0.893) | nan |
| 1 lux | 100 | 0 | 0.195 (0.913) | nan |
| 3 lux | 100 | 100 | 0.098 (0.674) | 0.168 |
| 3 lux | 100 | 100 | 0.097 (0.684) | 0.164 |
| 5 lux | 100 | 100 | 0.087 (0.723) | 0.137 |
| 5 lux | 100 | 100 | 0.091 (0.722) | 0.132 |
| 10 lux | 100 | 100 | 0.098 (0.721) | 0.106 |
| 10 lux | 100 | 100 | 0.097 (0.738) | 0.105 |
| 30 lux | 100 | 100 | 0.100 (0.860) | 0.092 |
| 30 lux | 100 | 100 | 0.100 (0.817) | 0.088 |
| 50 lux | 100 | 100 | 0.103 (0.736) | 0.101 |
| 50 lux | 100 | 100 | 0.102 (0.757) | 0.099 |
| 100 lux | 100 | 100 | 0.121 (0.801) | 0.107 |
| 100 lux | 100 | 100 | 0.100 (0.775) | 0.118 |
| 400 lux | 100 | 100 | 0.086 (0.775) | 0.093 |
| 400 lux | 100 | 100 | 0.085 (0.750) | 0.093 |
| 700 lux | 100 | 100 | 0.102 (0.602) | 0.116 |
| 700 lux | 100 | 100 | 0.107 (0.610) | 0.120 |
| shadow 1 | 100 | 42.0 | 0.254 (0.612) | 0.122 |
| shadow 2 | 100 | 30.1 | 0.284 (0.618) | 0.130 |
| shadow 3 | 100 | 36.9 | 0.285 (0.612) | 0.141 |
| motion 1 | 74.1 | 16.3 | 1.591 (0.786) | 0.1.54 |
| motion 2 | 78.8 | 32.1 | 1.347 (0.788) | 0.160 |
| motion 3 | 80.3 | 31.1 | 1.347 (0.795) | 0.147 |

$\epsilon_{re}$, for each of our 26 testing sequences. Notice that OpenCV is unable to return a marker pose for images at 1 lux or darker (indicated by nan). The deep reprojection error column also lists the error without subpixel localization (e.g., RefineNet) in parenthesis. In these examples, subpixel localization reduces the reprojection error in all cases except the motion blur scenario, because in those cases the "true corner" is outside of the central 8×8 refinement region.

Example AR Implementation

FIG. 11 illustrates an example of a wearable display system 1100 that can be used to present a VR, AR, or MR experience to a display system wearer or viewer 1104. The wearable display system 1100 may be programmed to perform any of the applications or embodiments described herein, such as estimating pose of markers using the DNN 105, including one or more of the 2HCNN 102, the subpixel refinement 103, and/or the pose estimation 104. For example, the system 1100 may obtain images of an environment of a user (e.g., a room or area the user is located in) and process the images to identify one or more markers in the images (e.g., a ChArUco board in the images). The pose of the markers may then be estimated using the systems and methods discussed herein, and used to estimate pose of the wearable system 1100.

In the example of FIG. 11, the display system 1100 includes a display 1108, and various mechanical and electronic modules and systems to support the functioning of that display 1108. The display 1108 may be coupled to a frame 1112, which is wearable by the display system wearer or viewer 1104 and which is configured to position the display 1108 in front of the eyes of the wearer 1104. The display 1108 may be a light field display. In some embodiments, a speaker 1116 is coupled to the frame 1112 and positioned adjacent the ear canal of the user in some embodiments, another speaker, not shown, is positioned adjacent the other ear canal of the user to provide for stereo/shapeable sound control. The display system 1100 can include an outward-facing imaging system 1144 (e.g., one or more cameras) that can obtain images (e.g., still images or video) of the environment around the wearer 1104. Images obtained by the outward-facing imaging system 1144 can be analyzed by embodiments of the DNN to determine a pose of the AR headset worn by the wearer 1104.

The display 1108 is operatively coupled 1120, such as by a wired lead or wireless connectivity, to a local data processing module 1124 which may be mounted in a variety of configurations, such as fixedly attached to the frame 1112, fixedly attached to a helmet or hat worn by the user, embedded in headphones, or otherwise removably attached to the user 1104 (e.g., in a backpack-style configuration, in a belt-coupling style configuration).

The local processing and data module 1124 may comprise a hardware processor, as well as non-transitory digital memory, such as non-volatile memory e.g., flash memory, both of which may be utilized to assist in the processing, caching, and storage of data. The data include data (a) captured from sensors (which may be, e.g., operatively coupled to the frame 1112 or otherwise attached to the wearer 1104), such as image capture devices (such as cameras), microphones, inertial measurement units, accelerometers, compasses, GPS units, radio devices, and/or gyros; and/or (b) acquired and/or processed using remote processing module 1128 and/or remote data repository 1132, possibly for passage to the display 1108 after such processing or retrieval. The local processing and data module 1124 may be operatively coupled to the remote processing module 1128 and remote data repository 1132 by communication links 1136, 1140, such as via a wired or wireless communication links, such that these remote modules 1128, 1132 are operatively coupled to each other and available as resources to the local processing and data module 1124. The image capture device(s) can be used to capture the eye images used in the eye image segmentation, or eye tracking procedures.

In some embodiments, the remote processing module 1128 may comprise one or more processors configured to analyze and process data and/or image information such as video information captured by an image capture device. The video data may be stored locally in the local processing and data module 1124 and/or in the remote data repository 1132. In some embodiments, the remote data repository 1132 may comprise a digital data storage facility, which may be available through the internet or other networking configuration in a "cloud" resource configuration. In some embodiments, all data is stored and all computations are performed in the local processing and data module 1124, allowing fully autonomous use from a remote module.

In some implementations, the local processing and data module 1124 and/or the remote processing module 1128 are programmed to perform embodiments of the Pose Estimation Deep Neural Network ("DNN"), including those discussed above and/or included in the claims appended below. The image capture device can capture video for a particular application (e.g., augmented reality (AR) or mixed reality (MR), human-computer interaction (HCI), autonomous vehicles, drones, or robotics in general). The video (or one or more frames from the video) can be analyzed using an embodiment of the DNN by one or both of the processing modules 1124, 1128. In some cases, off-loading at least some of the DNN analysis to a remote processing module (e.g., in the "cloud") may improve efficiency or speed of the computations. The parameters of the DNN (e.g., weights, bias terms, subsampling factors for pooling layers, number and size of kernels in different layers, number of feature maps, etc.) can be stored in data modules 1124 and/or 1132.

The results of the DNN analysis can be used by one or both of the processing modules 1124, 1128 for additional operations or processing. For example, the processing modules 1124, 1128 of the wearable display system 1100 can be programmed to perform additional applications, such as augmented or mixed reality, indoor navigation, or scene reconstruction or rendering, based on the output of the method 1100.

The DNN can be used with other object recognizers or deep learning systems that analyze images for objects in the user's environment. For example, U.S. patent application Ser. No. 15/812,928, filed Nov. 14, 2017, entitled Deep Learning System for Cuboid Detection, which is hereby incorporated by reference herein in its entirety for all it contains, describes machine learning techniques to detect 3D cuboid-shaped objects in images.

Example Implementations

The systems, methods, and devices described herein each have several aspects, no single one of which is solely responsible for its desirable attributes. Without limiting the scope of this disclosure, several non-limiting features will now be discussed briefly. The following paragraphs describe various example implementations of the devices, systems, and methods described herein. A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

Example One: A system comprises a mixed reality device including a wearable headset and a handheld controller; a hardware computer processor; and a non-transitory computer readable medium having software instructions stored thereon, the software instructions executable by the hardware computer processor to cause the system to perform operations comprising: accessing, from an imaging device, an image including a plurality of fiducial markers on a substrate; applying multiple stages of encoding to the image to generate an encoded image with reduced dimensionality; applying a first neural network to the encoded image to determine two-dimensional locations of fiducial markers in the encoded image; applying a second neural network to the encoded image to determine identifiers associated with respective fiducial markers detected in the encoded image; and determining a pose of the imaging device based at least on the determined two-dimensional locations of fiducial markers and the determined identifiers of the fiducial markers.

Example Two: The system of example one, wherein pose of the imaging device is determined based on application of a perspective-n-point algorithm.

Example Three: The system of examples one or two, wherein the pose is further determined based on one or more intrinsic parameters of the imaging device.

Example Four: The system of any of examples one through three, wherein the operations further comprise: outputting, from the first neural network, a first plurality of image patches of the encoded image; and determining, for each of the first plurality of images, based on application of a subpixel localization algorithm, a corresponding plurality of subpixel corners.

Example Five: The system of example four, wherein the subpixel corners indicate locations at a multiple of a resolution of the encoded image.

Example Six: The system of any of examples three through five, wherein determining the pose of the imaging device is further based on the determined subpixel corners.

Example Seven: The system of any of examples one through six, wherein the fiducial markers are ChArUco markers.

Example Eight: The system of any of examples one through seven, wherein the multiple stages of encoding include one or more max-pooling layers.

Example Nine: The system of any of examples one through eight, wherein spatial dimensionality of the image is reduced by a factor of eight in the encoded image.

Example Ten: The system of any of examples one through nine, wherein a quantity of image patches is based on a maximum quantity of fiducial markers in the image.

Example Eleven: The system of any of examples one through ten, wherein the imaging device comprising a camera of a wearable augmented reality headset.

Example Twelve: The system of example eleven, wherein virtual content displayed by the wearable augmented reality headset is determined based at least partly on the determined pose of the imaging device.

Example Thirteen: The system of any of examples one through twelve, wherein the two-dimensional locations of fiducial markers in the encoded image include, for each of a plurality of fiducial marker locations on the substrate, probabilities of each of multiple fiducial markers being at the fiducial marker location.

Example Fourteen: The system of example thirteen, wherein each the plurality of fiducial marker locations are each different portions of the encoded image associated with the substrate.

Example Fifteen: The system of any of examples one through fourteen, wherein the determined identifiers associated with fiducial markers in the encoded image include, for each of a plurality of fiducial marker locations on the substrate, probabilities of each of multiple identifiers being encoded at the fiducial marker location.

Example Sixteen: A system for determined pose of a camera, the system comprising: an encoder configured to perform spatial downsampling of an image acquired from a augmented reality headset; a two-headed convolutional neural network including: a first head configured to detect two-dimensional locations of fiducial boards in the downsampled image; a second head configured to determine identifiers encoded at the detected two-dimensional locations of fiducial boards in the downsampled image; a subpixel refinement component configured to take as input an image patches of the downsampled image and, for each image patch, output a subpixel corner location; and a pose estimation component configured to determine a pose of the augmented reality headset based at least on the detected two-dimensional locations and the subpixel corner locations.

Example Seventeen: The system of example sixteen, wherein the spatial downsampling includes one or more pooling layers.

Example Eighteen: The system of any of examples sixteen or seventeen, further comprising: a training component configured to train the two-headed convolutional neural network based on a plurality of video sequences wherein each frame of the video sequences undergoes a synthetic distortion.

Example Nineteen: The system of example eighteen, wherein the synthetic distortions are selected randomly to achieve a desired proportion of each of a plurality of synthetic distortions.

Example Twenty: The system of example nineteen, wherein the synthetic distortions include one or more of: added Gaussian noise; motion blur; Gaussian blur; speckle noise; brightness rescale; shadow or spotlight effect; or homographic transform.

Example Twenty-one: The system of any of examples eighteen through twenty, wherein the training component is further configured to train the pose estimation component based on a plurality of images each with one ground-truth corner within a central portion.

Example Twenty-two: The system of example twenty-one, wherein central portions of the images are less than fifty percent of pixels of the images.

Example Twenty-three: A method comprising steps of any one of examples one through twenty-two.

ADDITIONAL CONSIDERATIONS

Each of the processes, methods, and algorithms described herein and/or depicted in the attached figures may be embodied in, and fully or partially automated by, code modules executed by one or more physical computing systems, hardware computer processors, application-specific circuitry, and/or electronic hardware configured to execute specific and particular computer instructions. For example, computing systems can include general purpose computers (e.g., servers) programmed with specific computer instructions or special purpose computers, special purpose circuitry, and so forth. A code module may be compiled and linked into an executable program, installed in a dynamic link library, or may be written in an interpreted programming language. In some implementations, particular operations and methods may be performed by circuitry that is specific to a given function.

Further, certain implementations of the functionality of the present disclosure are sufficiently mathematically, computationally, or technically complex that application-specific hardware or one or more physical computing devices (utilizing appropriate specialized executable instructions) may be necessary to perform the functionality, for example, due to the volume or complexity of the calculations involved or to provide results substantially in real-time. For example, a video may include many frames, with each frame having millions of pixels, and specifically programmed computer hardware is necessary to process the video data to provide a desired image processing task or application in a commercially reasonable amount of time.

Code modules or any type of data may be stored on any type of non-transitory computer-readable medium, such as physical computer storage including hard drives, solid state memory, random access memory (RAM), read only memory (ROM), optical disc, volatile or non-volatile storage, combinations of the same and/or the like. The methods and modules (or data) may also be transmitted as generated data signals (e.g., as part of a carrier wave or other analog or digital propagated signal) on a variety of computer-readable transmission mediums, including wireless-based and wired/cable-based mediums, and may take a variety of forms (e.g., as part of a single or multiplexed analog signal, or as multiple discrete digital packets or frames). The results of the disclosed processes or process steps may be stored, persistently or otherwise, in any type of non-transitory, tangible computer storage or may be communicated via a computer-readable transmission medium.

Any processes, blocks, states, steps, or functionalities in flow diagrams described herein and/or depicted in the attached figures should be understood as potentially representing code modules, segments, or portions of code which include one or more executable instructions for implementing specific functions (e.g., logical or arithmetical) or steps in the process. The various processes, blocks, states, steps, or functionalities can be combined, rearranged, added to, deleted from, modified, or otherwise changed from the illustrative examples provided herein. In some embodiments, additional or different computing systems or code modules may perform some or all of the functionalities described herein. The methods and processes described herein are also not limited to any particular sequence, and the blocks, steps, or states relating thereto can be performed in other sequences that are appropriate, for example, in serial, in parallel, or in some other manner. Tasks or events may be added to or removed from the disclosed example embodiments. Moreover, the separation of various system components in the implementations described herein is for illustrative purposes and should not be understood as requiring such separation in all implementations. It should be understood that the described program components, methods, and systems can generally be integrated together in a single computer product or packaged into multiple computer products. Many implementation variations are possible.

The processes, methods, and systems may be implemented in a network (or distributed) computing environment. Network environments include enterprise-wide computer networks, intranets, local area networks (LAN), wide area networks (WAN), personal area networks (PAN), cloud computing networks, crowd-sourced computing networks, the Internet, and the World Wide Web. The network may be a wired or a wireless network or any other type of communication network.

The systems and methods of the disclosure each have several innovative aspects, no single one of which is solely responsible or required for the desirable attributes disclosed herein. The various features and processes described herein may be used independently of one another, or may be combined in various ways. All possible combinations and subcombinations are intended to fall within the scope of this disclosure. Various modifications to the implementations described in this disclosure may be readily apparent to those skilled in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the novel features disclosed herein.

Certain features that are described in this specification in the context of separate implementations also can be implemented in combination in a single implementation. Conversely, various features that are described in the context of a single implementation also can be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination. No single feature or group of features is necessary or indispensable to each and every embodiment.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list. In addition, the articles "a," "an," and "the" as used in this application and the appended claims are to be construed to mean "one or more" or "at least one" unless specified otherwise.

As used herein, a phrase referring to "at least one of" a list of items refers to any combination of those items, including single members. As an example, "at least one of: A, B, or C" is intended to cover: A, B, C, A and B, A and C, B and C, and A, B, and C. Conjunctive language such as the phrase "at least one of X, Y and Z," unless specifically stated otherwise, is otherwise understood with the context as used in general to convey that an item, term, etc. may be at least one of X, Y or Z. Thus, such conjunctive language is not generally intended to imply that certain embodiments require at least one of X, at least one of Y and at least one of Z to each be present.

Similarly, while operations may be depicted in the drawings in a particular order, it is to be recognized that such operations need not be performed in the particular order shown or in sequential order, or that all illustrated operations be performed, to achieve desirable results. Further, the drawings may schematically depict one more example processes in the form of a flowchart. However, other operations that are not depicted can be incorporated in the example methods and processes that are schematically illustrated. For example, one or more additional operations can be performed before, after, simultaneously, or between any of the illustrated operations. Additionally, the operations may be rearranged or reordered in other implementations. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products. Additionally, other implementations are within the scope of the following claims. In some cases, the actions recited in the claims can be performed in a different order and still achieve desirable results.

What is claimed is:

1. A system comprising:
   a mixed reality device comprising a wearable headset and a handheld controller; a hardware computer processor;
   a non-transitory computer readable medium having software instructions stored thereon, the software instructions executable by the hardware computer processor to cause the system to perform operations comprising:
      accessing, from an imaging device, an image comprising a plurality of fiducial markers on a substrate;
      applying, using a two-headed convolutional neural network, a plurality of stages of encoding to the image to generate an encoded image with reduced dimensionality;
      applying a first neural network head of the two-headed convolutional neural network to the encoded image to determine two-dimensional locations of fiducial markers in the encoded image;
      applying a second neural network head of the two-headed convolutional neural network to the encoded image to determine identifiers associated with respective fiducial markers detected in the encoded image;
      determining, using a subpixel refinement component, a subpixel corner location based on the two-dimensional locations; and
      determining a pose of the imaging device based at least on the subpixel corner location and the determined identifiers of the fiducial markers.

2. The system of claim 1, wherein the pose of the imaging device is determined based on application of a perspective-n-point algorithm.

3. The system of claim 1, wherein the pose is further determined based on one or more intrinsic parameters of the imaging device.

4. The system of claim 1, wherein the operations further comprise:
   outputting, from the first neural network head, a first plurality of image patches of the encoded image; and
   determining, for each of the first plurality of image patches, based on application of a subpixel localization algorithm, a plurality of subpixel corners.

5. The system of claim 4, wherein the subpixel corners indicate locations at a multiple of a resolution of the encoded image.

6. The system of claim 4, wherein determining the pose of the imaging device is further based on the plurality of subpixel corners.

7. The system of claim 1, wherein the fiducial markers are ChArUco markers.

8. The system of claim 1, wherein the plurality of stages of encoding comprise one or more max-pooling layers.

9. The system of claim 8, wherein spatial dimensionality of the image is reduced by a factor of eight in the encoded image.

10. The system of claim 1, wherein a quantity of image patches is based on a maximum quantity of fiducial markers in the image.

11. The system of claim 1, wherein the imaging device comprising a camera of a wearable augmented reality headset.

12. The system of claim 11, wherein virtual content displayed by the wearable augmented reality headset is determined based at least partly on the pose of the imaging device.

13. The system of claim 1, wherein the two-dimensional locations of fiducial markers in the encoded image comprise, for each of a plurality of fiducial marker locations on the substrate, probabilities of each of multiple fiducial markers being at the fiducial marker location.

14. The system of claim 13, wherein each the plurality of fiducial marker locations are each different portions of the encoded image associated with the substrate.

15. The system of claim 1, wherein the determined identifiers associated with fiducial markers in the encoded image comprise, for each of a plurality of fiducial marker locations on the substrate, probabilities of each of multiple identifiers being encoded at the fiducial marker location.

16. A system for determining pose of a camera, the system comprising:
- an encoder comprising one or more processors and performing spatial downsampling of an image acquired from an augmented reality headset to generate a spatially downsampled image;
- a two-headed convolutional neural network comprising:
  - a first head that detects two-dimensional locations of fiducial boards in the spatially downsampled image;
  - a second head that determines identifiers encoded at the two-dimensional locations of fiducial boards in the spatially downsampled image;
- a subpixel refinement component that receives as input image patches of the spatially downsampled image and, for each image patch, provides as output a subpixel corner location determined based on the two-dimensional locations of fiducial boards in the spatially downsampled image; and
- a pose estimation component that determines a pose augmented reality headset based at least on the two-dimensional locations and the subpixel corner locations.

17. The system of claim 16, wherein the spatial downsampling comprises one or more pooling layers.

18. The system of claim 16, further comprising:
- a training component configured to train the two-headed convolutional neural network based on a plurality of video sequences wherein each frame of the video sequences undergoes a synthetic distortion.

19. The system of claim 18, wherein synthetic distortions are selected randomly to achieve a desired proportion of each of a plurality of synthetic distortions.

20. The system of claim 19, wherein the synthetic distortions comprise one or more of:
added Gaussian
noise; motion
blur;
Gaussian blur;
speckle noise;
brightness
rescale;
shadow or spotlight
effect; or homographic
transform.

* * * * *